United States Patent
Lloyd

[19]
[11] Patent Number: 5,870,603
[45] Date of Patent: Feb. 9, 1999

[54] METHOD AND SYSTEM FOR STORING EXPONENT CODES IN A MULTI-PROCESSOR COMPUTER TO PRODUCE PUTPUTS ACCORDING TO AN EXECUTION SCHEDULE

[75] Inventor: Scott Edward Lloyd, Hoffman Estates, Ill.

[73] Assignee: Motorola, Inc., Schaumburg, Ill.

[21] Appl. No.: 853,613

[22] Filed: May 9, 1997

Related U.S. Application Data

[63] Continuation of Ser. No. 401,517, Mar. 10, 1995, abandoned.

[51] Int. Cl.$^6$ ........................................ G06F 9/00

[52] U.S. Cl. ............................ 395/670; 711/122

[58] Field of Search ..................... 395/379, 706, 395/200.68, 672; 711/100, 106, 122

[56] References Cited

U.S. PATENT DOCUMENTS

| | | | |
|---|---|---|---|
| 4,847,755 | 7/1989 | Morrison et al. | 364/200 |
| 5,434,972 | 7/1995 | Hamlin | 395/200 |

*Primary Examiner*—Majid A. Banankhan
*Attorney, Agent, or Firm*—James E. Gauger

[57] ABSTRACT

A method and system utilized by a multi-processor computer for storing exponent codes is provided. The multi-processor computer includes a plurality of processing elements. Each processing element executes a task having an instruction set. The processing elements are assigned a position in an execution sequence that defines the order in which the processing elements generate their respective outputs. Instruction sets are stored in a computer memory attached to the processing elements. The instruction sets are stored so that the processing elements produce outputs according to the execution schedule. The computer memory can be accessed using a two-dimensional addressing scheme where one dimension designates processing elements and the other designates instructions. Each instruction set includes one or more exponent codes that cause a processing element to raise an input value to a specified power.

21 Claims, 4 Drawing Sheets

METHOD AND SYSTEM FOR STORING EXPONENT CODES IN A MULTI-PROCESSOR COMPUTER TO PRODUCE PUTPUTS ACCORDING TO AN EXECUTION SCHEDULE

This is a continuation of application Ser. No. 08/401,517, filed Mar. 10, 1995 and now abandoned.

RELATED INVENTIONS

The present invention is related to the following inventions which are assigned to the same assignee as the present invention:

(1) "Neural Network and Method of Using Same", having Ser. No. 08/076,601, filed Jun. 14, 1993, Pat. No. 5,517,667.

The subject matter of the above-identified related invention is incorporated by reference hereby into the disclosure of this invention.

FIELD OF THE INVENTION

The present invention relates generally to multiprocessor computers and, in particular, to a multiprocessor computer in which individual processors generate outputs according to a predetermined order.

BACKGROUND OF THE INVENTION

A dominant characteristic of a multiprocessor computer is that it is capable of concurrently executing a number of different software routines or "tasks". Typically, a program is broken down into one or more tasks, and each task is executed by a respective processing element. A multiprocessor computer has at least two processing elements. Although most common computers use a single processor, there are, in fact, many multiprocessor computers available today. The number of processing elements in each of these computers varies from two to 64,000.

As a result of executing a task, a processing element within a multiprocessor computer will generate one or more outputs. These outputs may be produced simultaneously with the outputs of other processing elements. In many circumstances, it is necessary to coordinate the generation of outputs among the processing elements. For example, in a situation where data dependency exists between two or more tasks, i.e., a successively executing task relies upon the outputs of one or more processing elements, it is necessary to synchronize the arrival of the data with the execution of the successive task.

One method currently used to synchronize the arrival of output data is polling. Using a polling method, a task waiting for data will individually poll each processing element to determine whether or not a respective output is available. Although this method allows the task to process the outputs in a coordinated fashion, it incurs a substantial amount of execution overhead. The task must repetitively execute a polling routine, which adds cost and complexity to the computer. Another method used to coordinate the arrival of outputs is the use of an interrupt processing scheme. Using this method, each processing element, upon generating an output, interrupts a successive task which is to receive the output. There are two drawbacks to using the interrupt method. First, the interrupt method adds substantial processing overhead to the computer. Second, the interrupt scheme adds considerable design complexity to the computer, which in turn increases its cost. A third technique taught by the prior art for coordinating the arrival of outputs of processing elements is to simply allow a successive task to wait until all the processing elements have generated their outputs. After the processing elements have finished generating outputs, the successive task receives the outputs and resumes execution. Such a technique is simple to implement; however, it will negatively effect the throughput of the computer because the successive task will be idle for large amounts of time waiting for data.

Thus, there exists a need for an improved method of coordinating the arrival of data outputs from processing elements in a multiprocessor system. Such a method should be simple to implement and improve the overall throughput of the multiprocessor system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Generally, the present invention provides a method and system for storing a plurality of instructions in a computer memory. This method is accomplished according to the following steps. First, a computable problem is defined as a plurality of tasks which may be executed on a plurality of processing elements. Each of the processing elements is then assigned a position in an execution schedule. Then, the instructions for each of the tasks is stored in the memory so that the tasks are executed by the processing elements according to the execution schedule. Such a method and system provide a technique for storing the instructions which causes the processing elements to generate their respective outputs in a coordinated fashion.

It is an advantage of the present invention to provide a method for storing instructions which allows a multiprocessor computer to execute with much greater throughput and with a reduced cost of implementation. The present invention is more fully described as follows, with reference to FIGS. 1–5.

It will be understood by one of ordinary skill in the art that the method and system of the present invention may be implemented in hardware or software, or any combination thereof, and that the term "task" is defined by this disclosure to mean any action by a processing element which includes at least one logic, arithmetic, or data manipulation operation.

Figure 1:
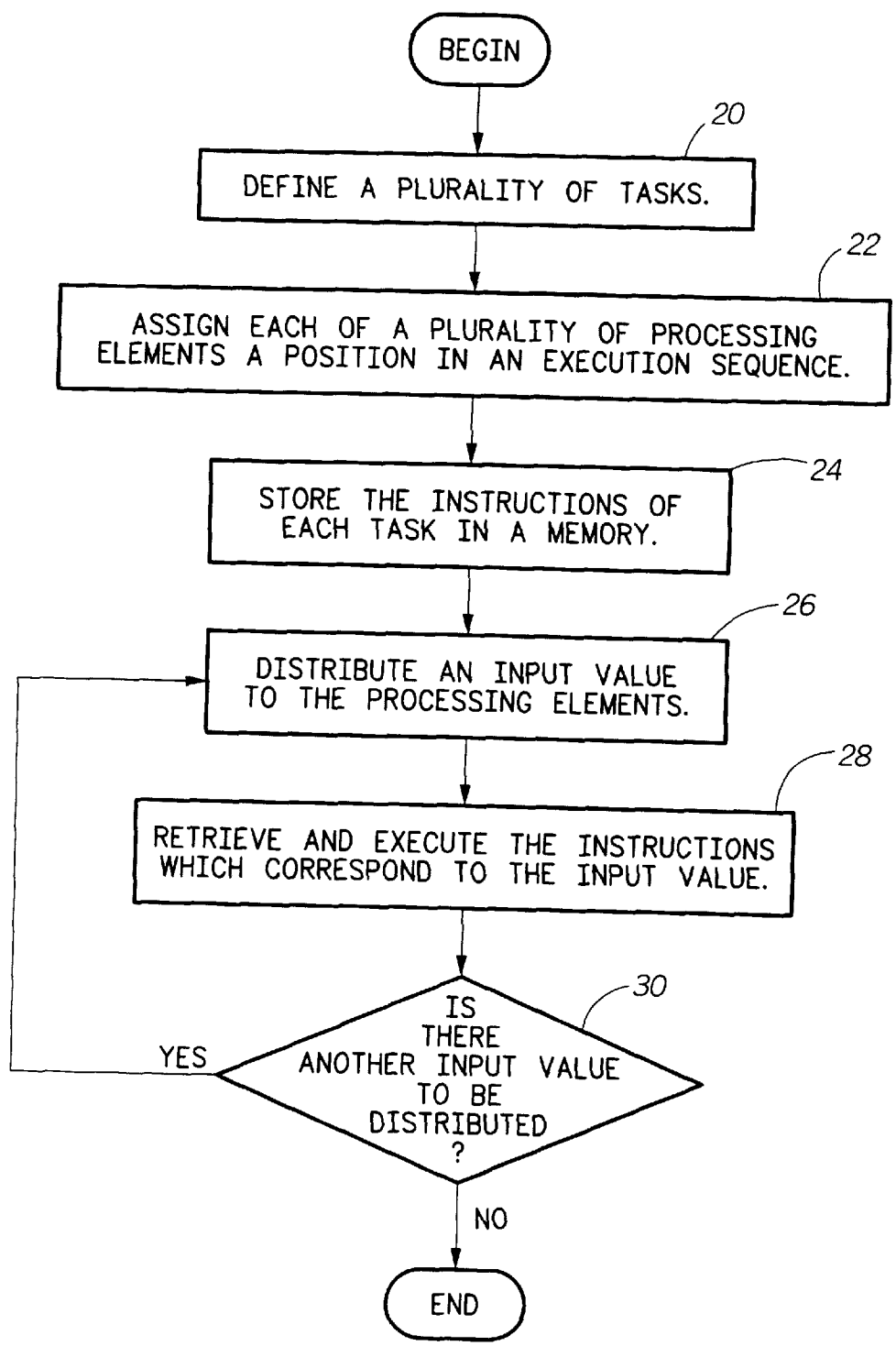
FIG. 1 illustrates a flow diagram of a method of storing and executing a plurality of instructions in a computer in a dance with a preferred embodiment of the present invention.

FIG. 1 illustrates a flow diagram of a method of storing and executing a plurality of instructions in a computer in accordance with a preferred embodiment of the present invention. The method is typically used in a computer which includes a plurality of processing elements and a memory operatively coupled to the processing elements. For the purposes of present invention, a processing element is defined as an electronic device that implements an automaton which is capable of performing logic, arithmetic, or data manipulation operations. Such a device could be a computer processor, for instance, a microprocessor, or an integrated circuit containing digital logic. In box 20, a plurality of tasks is defined. Each of the tasks includes a plurality of instructions which are executable on at least one of the processing elements. The instructions command a processing element to carry out its operations. Generally, an instruction is a coded vector of a binary value and is often referred to as an op code or machine language instruction. An instruction may be represented by a mnemonic in an assembly level language. The instructions used by a task are referred to as an instruction set.

In box 22, each of the processing elements is assigned a position in an execution schedule. The execution schedule defines an order, over time, in which the processing elements generate their outputs. In a software implementation, the execution schedule could be represented by an array variable, while the position in the sequence could be indicated by an array index. Values in the array could indicate the times at which output signals may be generated by the processing elements. Next, in box 24, the instruction set for each of the tasks is stored in the memory so that each task is executable by one of the processing elements and so that the processing elements generate a plurality of output signals according to the execution schedule. The output signals are binary vectors which represent data values. In box 26, an input signal is distributed to each of the processing elements. The input signal represents a data value and could be, for example, a binary vector which represents a floating point value. In box 28, the instructions which correspond to the input signal are retrieved and executed. At least one instruction is retrieved for each of the processing elements. In decision box 30, a check is made to determine whether or not another input signal is to be distributed to the processing elements. If so, the method returns to box 26. If not the method terminates.

In a computer program, the steps included in boxes 20, 22, and 24 may be executed during a pre-processing phase of execution, while the steps included in boxes 26, 28, and 30 may be executed during run-time operation software. Organizing a computer program to execute the method in this fashion significantly increases the performance of the computer during run-time execution. To further increase the execution speed of a computer, the steps included in boxes 26, 28, and 30 could be implemented in hardware using a digital logic device, such as an Application Specific Integrated Circuit (ASIC).

Figure 2:
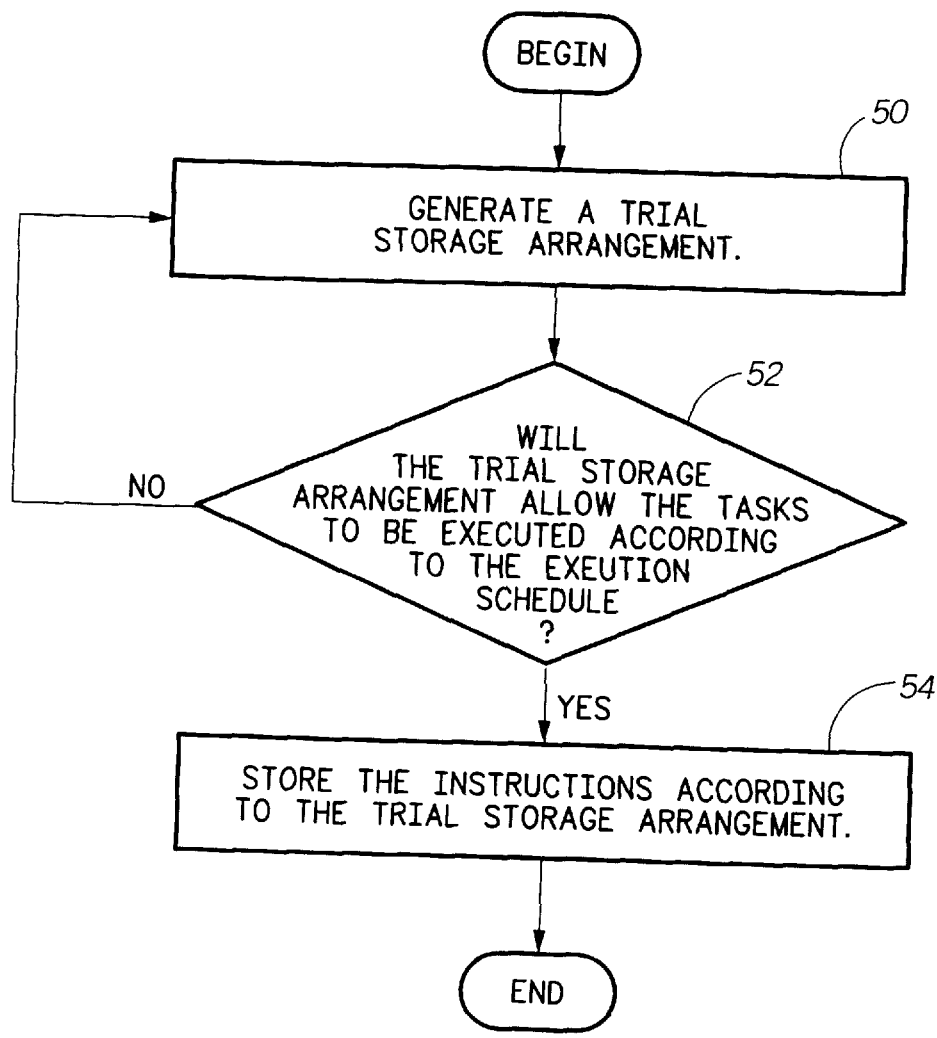
FIG. 2 illustrates a flow diagram which provides further de of the method shown in FIG. 1.

FIG. 2 illustrates a flow diagram which provides further details of box 24 of the method shown in FIG. 1. FIG. 2 depicts a method of using trial storage arrangements in accordance with a preferred embodiment of the present invention. In box 50, a trial storage arrangement of the instructions is generated. Essentially, a trial storage arrangement pre-assigns the tasks to the processing elements so that a comparison can be made to determine whether the tasks will be executed according to the execution schedule. In a computer, the trial storage arrangement can be a two-dimensional array which indicates where the instructions for the tasks will be stored within the memory. The indexes of the array can represent memory addresses. A software routine can create a trial storage arrangement by assigning instructions to each location in the array. In decision box 52, a check is made to determine whether the trial storage arrangement will allow the tasks to be executed by the processing elements in accordance with the execution schedule. If so, the instructions are stored in the memory according to the trial storage arrangement. If not, the method returns to box 50 and a different trial storage arrangement is generated. In a computer, a software routine can be used to compare the execution schedule and the trial storage arrangement.

In a preferred embodiment, a trial storage arrangement is generated as follows. First, each processing element is assigned an area in memory for storing instructions. For example, memory locations which have common first sub-addresses, such as the same column sub-address, are allocated to each processing element. Then, each task is assigned to a single processing element. In effect, the instruction set for each task is correlated to the memory locations allocated to one of the processing elements. Next, each input signal is associated with a second sub-address, such as a row sub-address. Each task has at least one instruction corresponding to each input signal and, in effect, each instruction is correlated with the second sub-address of the corresponding input signal. Thus, using the technique described above, each instruction is associated with a two-dimensional address which comprises a first and second sub-address.

In one embodiment of the present invention, the methods shown in FIGS. 1 and 2 are implemented by software running on a processor such as a microprocessor. However, one of ordinary skill will recognize that a programmable logic array, ASIC, or other digital logic device could also be used to implement any of the functions depicted by the methods.

Figure 3:
FIG. 3 depicts an example of storing instructions in a two dimensional address space in accordance with one embodiment of the present invention.

FIG. 3 depicts an example of storing instructions in a two-dimensional address space of the memory in accordance with one embodiment of the present invention. In the example shown, a first trial storage arrangement 60 is converted to a second trial arrangement 62 using the method shown in FIG. 2. As depicted, each processing element is allocated memory locations which correspond to a column sub-address. For instance, in both the first and second trial storage arrangements 60 and 62, processing element 1 (PE1) has its instructions located in the address space at column sub-address 0; processing element 2 (PE2) has its instructions located at column sub-address 1; processing element 3 (PE3) has its instructions located at column sub-address 2, and so forth. Each column stores the instruction set required by a task. The row sub-addresses are associated with a sequence of input signals. As shown, input signal $X_1$ corresponds to row sub-address 0, input signal $X_2$ corresponds to row sub-address 1, and so forth.

In the example shown, the instructions represent exponent codes having values between 0 and 3. In a preferred embodiment of the present invention, the exponent codes are 3-bit binary values. The exponent codes are used by the processing elements to compute exponent values which are used in the terms of a polynomial expansion. The value of each exponent code determines the power to which the corresponding input signal will be raised. For example, in the top row of the first trial storage arrangement 60 the left most exponent code indicates that the input signal $X_1$ will be raised to the first power by PE1; the second power by PE2, resulting in $X_1^2$; and the first power by PE3. PE4 and PE5 will raise $X_1$ to the power of zero, in other words, PE4 and PE5 will both compute a result having a value of one in response to the input signal $X_1$.

In one embodiment of the present invention, each task is executed by a processing element to compute a term given by Equation 1 below:

$$p = w x_1^{g_1} x_2^{g_2} \ldots x_n^{g_n} \qquad \text{Equation (1)}$$

where $x_i$ represent the input signals and can be a function such as $x_i = f_i(z_j)$, wherein $z_j$ is any arbitrary variable;

where p represents an output of the processing element;

where w represent a coefficient; where $g_1, \ldots, g_n$ represent exponents and are integers; and n is the number of input signals.

According to the first trial storage arrangement 60, the processing elements will compute the terms as shown below, in Table 1.

TABLE 1

| Processing Element | Term |
| --- | --- |
| PE1 | $x_1 x_4$ |
| PE2 | $x_1^2 x_3$ |
| PE3 | $x_1$ |
| PE4 | $x_2 x_4^2$ |
| PE5 | $x_2^3$ |

It will be apparent to one of ordinary skill in the art that the instruction sets of the tasks are not limited to representing the above-described exponent codes. For instance, the instruction set of a task may include an instruction set for a microprocessor.

The second trial storage arrangement 62 contains the instructions of the first trial arrangement 60 wherein the instructions have been rearranged in the two-dimensional address space to conform with the execution schedule. The execution schedule requires that the processing elements generate their respective outputs in order. Thus, in the example shown, PE1 generates its output before or concurrent with PE2; PE2 generates its output before or concurrent with PE3; PE3 generates its output before of concurrent with PE4; and PE4 generates its before or concurrent with PE5. In other words, a processing element occurring before other processing elements in the execution schedule must generate its output before or simultaneously with those other processing elements.

The second trial storage arrangement 62 is generated by applying the methods shown in FIG. 2 to the first trial storage arrangement 60. In this embodiment of the present invention, the instructions associated with the tasks are rearranged in the two-dimensional address space. For instance, the instruction set originally associated with PE3 of the first trial storage arrangement 60 is associated with PE1 in the second trial storage arrangement 62. By rearranging the task instruction sets, the processing elements are allowed to generate their respective outputs according the execution schedule. As shown in the second trial storage arrangement 62, PE1 will generate an output shortly after the arrival of input signal $X_1$; PE2 will generate an output shortly after the arrival of input signal $X_2$; and PE3 will generate an output shortly after the arrival of input signal $X_3$. Processing elements 4 and 5 will generate their outputs shortly after the arrival of input signal $X_4$. Therefore, the outputs of the processing elements will be available to a subsequent task in accordance with the execution schedule. This, in turn, will simplify the actions of a subsequent task in determining when outputs are available from the processing elements.

Figure 4:
FIG. 4 depicts an example of storing instructions in a two dimensional address space in accordance with another embodiment of the present invention.

FIG. 4 depicts an example of storing instructions in a two-dimensional address space of a memory in accordance with another embodiment of the present invention. FIG. 4 depicts the conversion of the first trial storage arrangement 60 to a third trial storage arrangement 72 using another embodiment of the present invention. In this embodiment, the input signals are re-ordered in their sequence. This in turn allows the processing elements to generate their respective outputs according to the execution schedule. For example, in the third trial storage arrangement 72 the instructions corresponding to input signal $X_4$ are relocated to row sub-address zero, while the instructions corresponding to input signal $X_1$ are relocated to row sub-address 1; the instructions corresponding to input signal $X_3$ are relocated to row sub-address 2; and the instructions corresponding to input signal $X_2$ are relocated to row sub-address 3.

It will be apparent to one of ordinary skill in the art that any combination of reassigning tasks to processing elements or re-ordering the sequence of input signals may be used to derive a trial storage arrangement.

Figure 5:
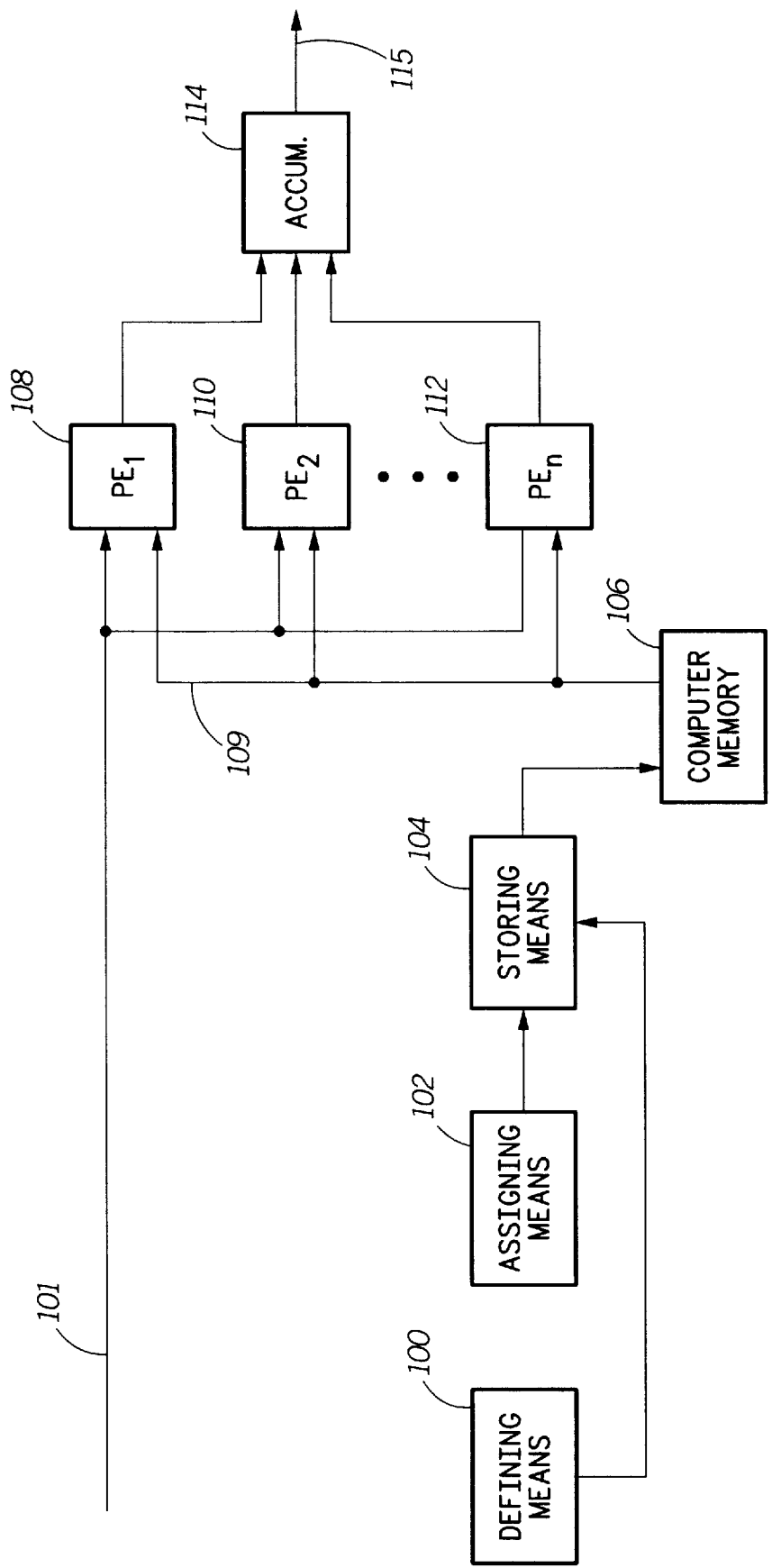
FIG. 5 illustrates a multiprocessor computer which incorporates one embodiment of the present invention.

FIG. 5 illustrates a multiprocessor computer which incorporates an embodiment of the present invention. The multiprocessor computer includes a plurality of processing elements, an accumulator 114, a computer memory 106, a storing means 104, an assigning means 102, and a defining means 100. In the example shown, the plurality of processing elements is represented by the three processing elements 108, 110, and 112.

The processing elements 108, 110, and 112 receive a sequence of input signals over distribution means 101. In one embodiment, distribution means is a 23-bit bus and the input signals are data value represented by fixed point integers. The processing elements 108, 110, and 112 receive instructions over bus 109. Typically, the instructions received across bus 109 are bit slices of a digital word provided by computer memory 106. In one embodiment, the instructions are 3-bit exponent codes, as described above in reference to FIGS. 3 and 4. For each input signal, each processing element receives a corresponding instruction. Each processing element generates an output on a corresponding output bus. The processing element outputs are in turn received by the accumulator 114 and summed together to generate an output signal 115. Essentially, the accumulator 114 executes a subsequent task which relies on the processing element outputs.

The defining means 100 defines the plurality of tasks to be performed by the processing element 108, 110, and 112. Each of the tasks is defined by a task ID, such as a software constant parameter, and an instruction set which is executable on at least one of the processing elements 108, 110, and 112. The task ID and instruction set of each task are passed to the storing means 104.

The assigning means 100 assigns each of the processing elements a position in the execution schedule, wherein the execution schedule defines the order, over time, in which each of the processing elements generates an output. The assigning means 100 passes the execution schedule to the storing means 104. In one embodiment of the present invention, the defining means 100 and the assigning means 102 are software routines that are executed by a computer program during pre-processing execution.

Upon receiving the execution schedule and the task definitions, the storing means 104 stores the instruction set for each task in the computer memory so that each task is executable by a corresponding one of the processing elements and the processing elements generate a plurality of output signals according to the execution schedule. In one version of the present invention, the storing means 104 is a memory management software routine which implements the method described in reference to FIG. 2. In this version, the instructions are stored according to a trial storage arrangement generated by the storing means 104.

The computer memory 106 stores the instructions and could also include a means (not shown) for retrieving and distributing the instructions stored in the computer memory 106 to the plurality of processing elements.

In a further embodiment of the present invention, the multiprocessor computer of FIG. 5 implements a polynomial expansion of which the general form is represented by equation 2 as follows:

$$y = \sum_{i=1}^{m} w_{i-1} x_1 g_{1i} x_2 g_{2i} \ldots x_n g_{ni} \qquad \text{Equation (1)}$$

where $x_i$ represent the input signals and can be a function such as $X_i = f_i(z_j)$, wherein $z_j$ is any arbitrary variable, and where the indices i, j, and m may be any integers; where y represents an output of the multiprocessor computer; where $w_{i-1}$ represent the coefficient for the ith term; where $g_{1i}, \ldots, g_{ni}$ represent the exponents for the ith term and are integers; and n is the number of input signals.

Each task is executed by a processing element to compute a term in the polynomial expansion of the form given by Equation 2. As an example, if either the first, second, or third trial storage arrangements 60, 62 or 72, were stored in the computer memory 106, the polynomial expansion computed according to the exponent codes would be: $y = x_1 x_4 + x_1^2 x_3 + x_1 + x_2 x_4^2 + x_2^3$.

In summary, the present invention as herein-disclosed provides a method and system for storing instructions which allows processing elements to generate a plurality of outputs according to an execution schedule, and thus allows a multiprocessor computer to execute with much greater throughput.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a computer which includes a plurality of processing elements and a computer memory operatively coupled to the plurality of processing elements, a method for storing a plurality of exponent codes in the computer memory, the method comprising the following steps:

defining a plurality of tasks, each of the plurality of tasks including at least one of the exponent codes;

assigning each of the plurality of processing elements a position in an execution schedule, wherein the execution schedule defines an order, over time, in which the plurality of processing elements generate a plurality of output signals as functions of the plurality exponent codes, each of the exponent codes causing at least one of the processing elements to generate at least one of the output signals as a function of a processing element input raised to a power other than one; and storing the plurality of exponent codes in the computer memory, wherein each of the plurality of tasks is executable by a corresponding one of the plurality processing elements and the plurality of processing elements generate the plurality of output signals according to the execution schedule.

2. The method of claim 1, wherein the plurality of exponent codes are accessible in the computer memory using a plurality of two-dimensional addresses, each of the plurality of two-dimensional addresses including a first sub-address and a second sub-address.

3. The method of claim 2, wherein the step of storing comprises the following substeps:

(a) for each of the plurality of processing elements, allocating a plurality of locations in the computer memory which have common first sub-addresses;

(b) for each of the plurality of tasks, correlating the at least one exponent code to the locations in the computer memory which are allocated to one of the plurality of processing elements, whereby generating a trial storage arrangement; and (c) determining whether the trial storage arrangement will allow the plurality of tasks to be executed by the plurality of processing elements in accordance with the execution schedule;
if so, storing the exponent codes according to the trial storage arrangement; and
if not, repeating step (b) to generate a different trial storage arrangement.

4. The method of claim 2, wherein the plurality of processing elements receive a sequence of input signals and each of the exponent codes corresponds to a respective one of the sequence of input signals.

5. The method of claim 4, wherein the step of storing comprises the following substeps:

(a) for each of the sequence of input signals, correlating to a common second sub-address ones of the exponent codes corresponding to a same input signal, whereby generating a trial storage arrangement; and (b) determining whether the trial storage arrangement win allow the plurality of tasks to be executed by the plurality of processing elements in accordance with the execution schedule;
if so, storing the exponent codes according to the trial storage arrangement; and
if not, repeating step (a) to generate a different trial storage arrangement.

6. The method of claim 1, for generating the output signals, the method further comprising the step of:

generating a signal as a function of the output signals that represents a polynomial expansion by distributing the exponent codes from the computer memory to the processing elements.

7. The method of claim 1, wherein the method is performed by a computer program during pre-processing execution.

8. A method for storing and retrieving a plurality of exponent codes in a computer memory, the method comprising the following steps:

(a) defining a plurality of tasks, each of the plurality of tasks including at least one of the exponent codes, and each of the exponent codes corresponding to a respective one of a sequence of input signals;

(b) assigning each of the plurality of processing elements a position in an execution schedule, wherein the execution schedule defines an order, over time, in which the plurality of processing elements generate a plurality of output signals as functions of the plurality exponent codes, each of the exponent codes causing at least one of the processing elements to generate at least one of the output signals as a function of a processing element input raised to a power other than one;

(c) storing the plurality of exponent codes in the computer memory, wherein each of the plurality of tasks is executable by a corresponding one of the plurality of processing elements and the plurality of processing elements generate the plurality of output signals according to the execution schedule;

(d) distributing an input signal to the plurality of processing elements; and (e) retrieving from the computer memory ones of the exponent codes corresponding to the input signal.

9. The method of claim 8, wherein the plurality of exponent codes are accessible in the computer memory using a plurality of two-dimensional addresses, each of the plurality of two-dimensional addresses including a first sub-address and a second sub-address.

10. The method of claim 9, wherein the step of storing comprises the following substeps:

(a) for each of the plurality of processing elements, allocating a plurality of locations in the computer memory which have common first sub-addresses;

(b) for each of the plurality of tasks, correlating the at least one exponent code to the locations in the computer memory which are allocated to one of the plurality of processing elements, whereby generating a trial storage arrangement; and (c) determining whether the trial storage arrangement will allow the plurality of tasks to be executed by the plurality of processing elements in accordance with the execution schedule;

if so, storing the exponent codes according to the trial storage arrangement; and if not, repeating step (b) to generate a different trial storage arrangement.

11. The method of claim 9, wherein the plurality of processing elements receive the sequence of input signals.

12. The method of claim 11, wherein the step of storing comprises the following substeps:

(a) for each of the sequence of input signals, correlating to a common second sub-address ones of the exponent codes corresponding to a same input signal, whereby generating a trial storage arrangement; and (b) determining whether the trial storage arrangement will allow the plurality of tasks to be executed by the processing elements in accordance with the execution schedule;

if so, storing the exponent codes according to the trial storage arrangement; and if not, repeating step (a) to generate a different trial storage arrangement.

13. The method of claim 9, wherein steps (d) and (e) are repeated for each of the sequence of input signals.

14. The method of claim 8, for generating the output signals, the method further comprising the step of:

generating the output signals to represent at least one polynomial expansion by distributing the exponent codes from the computer memory to the processing elements.

15. A computer, which comprises:

a plurality of processing elements for executing a plurality of tasks;

a computer memory, operatively coupled to the plurality of processing elements, for storing a plurality of exponent codes;

means for defining the plurality of tasks, each of the plurality of tasks including at least one of the exponent codes;

means for assigning each of the plurality of processing elements a position in an execution schedule, wherein the execution schedule defines an order, over time, in which the plurality of processing elements generate a plurality of output signals as functions of the exponent codes, each of the exponent codes causing at least one of the processing elements to generate at least one of the output signals as a function of a processing element input raised to a power other than one; and means for storing the at least one exponent code for each of the plurality of tasks in the computer memory, wherein each of the plurality of tasks is executable by a corresponding one of the plurality of processing elements and the plurality of processing elements generate the plurality of output signals according to the execution schedule.

16. The computer of claim 15, wherein the plurality of exponent codes are accessible in the computer memory using a plurality of two-dimensional addresses, each of the plurality of two-dimensional addresses including a first sub-address and a second sub-address.

17. The computer of claim 15, further comprising:

means for distributing a sequence of input signals to the plurality of processing elements; and means for retrieving and distributing the plurality of exponent codes from the computer memory to the plurality of processing elements.

18. The computer of claim 17, wherein each of the exponent codes corresponds to a respective one the sequence of input signals.

19. The computer of claim 15, further comprising:

means for generating a signal as a function of the output signals that represents a polynomial expansion.

20. The computer of claim 15, wherein the defining means and the assigning means are software routines that are executed by a computer program during pre-processing execution.

21. In a computer, a system for storing instructions, the system comprising:

a plurality of processing elements for executing a plurality of tasks;

a computer memory, operatively coupled to the plurality of processing elements, for storing a plurality of exponent codes;

a first software routine defining the plurality of tasks, each of the plurality of tasks including at least one of the exponent codes;

a second software routine assigning each of the plurality of processing elements a position in an execution schedule, wherein the execution schedule defines an order, over time, in which the plurality of processing elements generate a plurality of output signals as functions of the exponent codes, each of the exponent codes causing at least one of the processing elements to generate at least one of the output signals as a function of a processing element input raised to a power other than one; and a third software routine storing the at least one exponent code for each of the plurality of tasks in the computer memory, wherein each of the plurality of tasks is executable by a corresponding one of the plurality of processing elements and the plurality of processing elements generate the plurality of output signals according to the execution schedule.

* * * * *

UNITED STATES PATENT AND TRADEMARK OFFICE
CERTIFICATE OF CORRECTION

PATENT NO. : 5870,603
DATED : February 9, 1999
INVENTOR(S) : Lloyd, Scott

It is certified that error appears in the above-indentified patent and that said Letters Patent is hereby corrected as shown below:

In claim 5, column 8, line 33, change "win" to --will--.

Signed and Sealed this

Twentieth Day of July, 1999

Attest:

Q. TODD DICKINSON

*Attesting Officer*  Acting Commissioner of Patents and Trademarks